US008873641B2

(12) United States Patent
Arakawa

(10) Patent No.: US 8,873,641 B2
(45) Date of Patent: Oct. 28, 2014

(54) MOVING PICTURE CODING APPARATUS

(75) Inventor: Hiroshi Arakawa, Nara (JP)

(73) Assignee: Panasonic Corporation, Osaka (JP)

( * ) Notice: Subject to any disclaimer, the term of this patent is extended or adjusted under 35 U.S.C. 154(b) by 1736 days.

(21) Appl. No.: 12/136,949

(22) Filed: Jun. 11, 2008

(65) Prior Publication Data

US 2008/0317139 A1 Dec. 25, 2008

(30) Foreign Application Priority Data

Jun. 19, 2007 (JP) ................................ 2007-161657

(51) Int. Cl.
| H04N 7/12 | (2006.01) |
| H04N 19/15 | (2014.01) |
| H04N 21/234 | (2011.01) |
| H04N 21/44 | (2011.01) |
| H04N 21/24 | (2011.01) |
| H04N 19/149 | (2014.01) |
| H04N 19/152 | (2014.01) |
| H04N 21/434 | (2011.01) |
| H04N 19/179 | (2014.01) |
| H04N 19/115 | (2014.01) |
| H04N 21/2368 | (2011.01) |

(52) U.S. Cl.
CPC ... *H04N 19/00193* (2013.01); *H04N 19/00187* (2013.01); *H04N 21/23406* (2013.01); *H04N 21/44004* (2013.01); *H04N 21/2401* (2013.01); *H04N 19/00181* (2013.01); *H04N 21/44016* (2013.01); *H04N 21/4341* (2013.01); *H04N 19/0029* (2013.01); *H04N 19/0006* (2013.01); *H04N 21/2368* (2013.01)
USPC ............. 375/240.28; 375/240.02; 375/240.12

(58) Field of Classification Search
None
See application file for complete search history.

(56) References Cited

U.S. PATENT DOCUMENTS

| 5,793,436 | A | * | 8/1998 | Kim ............................... 348/447 |
| 6,105,083 | A | | 8/2000 | Kurtze et al. |
| 6,295,321 | B1 | | 9/2001 | Lyu |
| 6,381,254 | B1 | * | 4/2002 | Mori et al. ..................... 370/537 |
| 6,385,212 | B1 | * | 5/2002 | Baba et al. ..................... 370/506 |
| 6,792,047 | B1 | | 9/2004 | Bixby et al. |
| 7,075,994 | B2 | | 7/2006 | Ihara |
| 7,496,675 | B2 | * | 2/2009 | Obata et al. ................... 709/231 |
| 7,769,085 | B2 | | 8/2010 | Himeno et al. |
| 7,835,436 | B2 | * | 11/2010 | Aridome et al. ......... 375/240.01 |

(Continued)

FOREIGN PATENT DOCUMENTS

| JP | 2004-048103 | 2/2004 |
| JP | 2005-136633 | 5/2005 |
| JP | 3675464 | 5/2005 |

*Primary Examiner* — Gregory Sefcheck
*Assistant Examiner* — Daniel Mitchell
(74) *Attorney, Agent, or Firm* — Wenderoth, Lind & Ponack, L.L.P.

(57) ABSTRACT

A moving picture coding apparatus is provided, which controls coding of a following stream, according to virtual buffer occupancy determined by a generated amount of coded data and an amount of coded data transferred to an output destination, when generating the following stream, such that a preceding stream and the following stream, which both have an image stream multiplexed with other information, are reproduced seamlessly. The moving picture coding apparatus generates the preceding stream and the following stream by multiplexing the image stream and the other information to form the preceding stream and the following stream, and determines an initial value of the virtual buffer occupancy for the following stream according to an amount of delay resulting from the multiplexing, and the virtual buffer occupancy at an end of the preceding stream.

2 Claims, 9 Drawing Sheets

(56) References Cited

U.S. PATENT DOCUMENTS

| | | | |
|---|---|---|---|
| 2002/0080875 A1* | 6/2002 | Tahara et al. | 375/240.02 |
| 2005/0254574 A1 | 11/2005 | Himeno et al. | |
| 2006/0050778 A1 | 3/2006 | Aridome et al. | |
| 2006/0133474 A1* | 6/2006 | Veltman et al. | 375/240.01 |

\* cited by examiner

MOVING PICTURE CODING APPARATUS

BACKGROUND OF THE INVENTION (1) Field of the Invention

The present invention relates to a moving picture coding apparatus that codes moving picture data.

(2) Description of the Related Art

A single digital content, such as a movie, conventionally includes plural chapters. Such a chapter is, to be specific, a stream in which coded moving picture data and coded audio data are multiplexed.

Accordingly, when generating each stream included in a single digital content, it is necessary to control coding processing for generating the stream so that moving pictures are reproduced seamlessly without a break between streams.

Here, changes in data occupancy of a buffer in a decoding apparatus can be simulated using, for example, a virtual buffer called a Video Buffering Verifier (VBV) buffer assumed to exist in an coding apparatus that codes moving picture data.

Further, coding is controlled according to the result of the buffer simulation so as to prevent the buffer in the decoding apparatus from overflowing and underflowing.

FIG. 1 is a pattern diagram illustrating an example of changes in virtual buffer occupancy for two streams which are not connected seamlessly.

In the example illustrated in FIG. 1, each picture of a preceding stream 1101 is extracted from the virtual buffer at certain intervals. Storage of a following stream 1102 into the virtual buffer starts after a last picture B13 of the preceding stream 1101 has been decoded. It is to be noted that the above-described certain interval is an inverse number of a frame rate for each of the streams, 1/60 seconds, for example.

In this case, a break occurs between a decoded image of a picture B13 positioned last in the preceding stream 1101 and a decoded image of a picture I2 positioned first in the following stream 1102, as illustrated in the diagram.

FIG. 2 is a pattern diagram illustrating an example of changes in virtual buffer occupancy for two streams which are connected seamlessly.

As illustrated in FIG. 2, seamless reproduction is made possible by advancing a decode-starting time for the following stream, since a break between the decoded image of the picture B13 and the decoded image of the picture I2 is eliminated.

As described above, when the coding apparatus generates a following stream so as to be reproduced seamlessly after a preceding stream, it is necessary to take into account virtual buffer occupancy at the end of the preceding stream 1101.

This is because the following stream 1102 starts to be stored into the virtual buffer, with the virtual buffer occupancy not being zero. The following stream 1102 starts to be stored having the virtual buffer occupancy at the end of the preceding stream 1101 as a starting point.

As illustrated in FIG. 2, $S_0$ is assumed to be the virtual buffer occupancy at the end of the preceding stream 1101. In this case, the following stream 1102 starts to be stored at a time $t_1$, and the virtual buffer occupancy starts to increase from the $S_0$. Subsequently, the picture B13 is extracted from the virtual buffer at a time $t_3$, so that the virtual buffer occupancy becomes $S_1$.

The $S_1$ can be obtained based on the following: $S_0$ as a storage starting point; a storage period obtained by subtracting the time $t_1$ from the time $t_3$; an increasing angle θ for a storage amount; and an amount of coded data of the picture B13. It is to be noted that the increasing angle θ is a value determined by a bit rate of the following stream 1102.

Subsequently, the picture I2 is extracted from the virtual buffer at a time $t_4$. At this time, an amount of coded data of the picture I2 needs to be an amount not causing an underflow in the virtual buffer.

In view of the foregoing, the coding apparatus, when generating the picture I2, determines the amount of coded data of the picture I2 according to an initial value $S_{10}$ of the virtual buffer occupancy for the following stream 1102.

It is to be noted that the initial value of the virtual buffer occupancy for the following stream 1102 is, as illustrated in FIG. 2, the virtual buffer occupancy at a time ($t_4$) when image stream data included in the following stream 1102 is extracted from the virtual buffer for the first time. That is, in FIG. 2, $S_{10}$.

More specifically, the initial value $S_{10}$ can be obtained based on the following: the storage amount $S_1$ previously obtained at the time $t_3$, the storage period obtained by subtracting the time $t_3$ from the time $t_4$; and the increasing angle θ.

The coding apparatus subtracts a predetermined margin amount, as needed, from the initial value $S_{10}$ obtained in such a manner, and determines the amount of coded data of the picture I2 so as not to exceed a value obtained by the subtraction. Further, the coding apparatus codes moving picture data corresponding to the picture I2 so that the amount of coded data of the moving picture data becomes the determined amount of coded data.

Here, each value of the time $t_3$, the time $t_4$, and θ is a predetermined value. Accordingly, the coding apparatus only need to obtain the time $t_1$ and the $S_0$ for the determination of the initial value $S_{10}$ of the virtual buffer occupancy.

FIG. 3 is a functional block diagram illustrating an example of functional configuration of a conventional moving picture coding apparatus.

The moving picture coding apparatus 200 as illustrated in FIG. 3 includes: an audio coding unit 201 that generates an audio stream from an inputted signal; an image coding unit 202 that generates an image stream from an inputted signal; and a multiplexing unit 203 that multiplexes the audio stream with the image stream.

Further, the moving picture coding apparatus 200 holds, as virtual buffer information 204, information indicating a storage amount of a virtual buffer, which has been outputted from the image coding unit 202.

The multiplexing unit 203 notifies the image coding unit 202 of the virtual buffer occupancy $S_0$ at the end of the preceding stream 1101, and of the time $t_1$ that is the starting time of the image stream included in the following stream 1102.

The starting time $t_1$ can be obtained, for example, in the case where the following stream 1102 includes an audio stream which precedes an image stream as illustrated in FIG. 2, by adding a time corresponding to an amount of coded data of the audio stream to the time $t_0$ that is the time when the last bit (pad shown in FIG. 2) is stored in the virtual buffer.

In another example, the image coding unit 202 includes information of a predetermined value corresponding to the starting time $t_1$, and use the predetermined value as the starting time $t_1$ for buffer simulation without obtaining the starting time $t_1$ from the multiplexing unit 203.

The image coding unit 202 performs buffer simulation using the starting time $t_1$ and the virtual buffer occupancy $S_0$, and determines the initial value $S_{10}$ of the virtual buffer occupancy for the following stream 1102, before generating an image stream to be included in the following stream 1102.

Further, the image coding unit 202 controls coding processing according to the initial value.

A technique which relates to a seamless stream connection as described above is disclosed, for example, by Patent Reference 1: Japanese Patent No. 3675464.

Here, the multiplexing for the following stream 1102 cannot start prior to the end of the preceding stream 1101. More specifically, the multiplexing for the following stream 1102 can start only after the multiplexing for the preceding stream 1101 has been completed.

For the above reason, a time for multiplexing is practically required between the end of outputting the preceding stream 1101 and the start of outputting the following stream 1102.

Further in some cases, an end portion of the preceding stream 1101 or a start portion of the following stream 1102 may include specific information having control information for ending processing and starting processing for a multiplexed stream.

FIG. 4 is a pattern diagram illustrating differences in a starting time for an image stream included in the following stream 1102.

In (i) of FIG. 4, specific information is not included in either the preceding stream 1101 or the following stream 1102. Further in (ii) of FIG. 4, the preceding stream 1101 includes specific information 1203 and the following stream 1102 includes specific information 1204.

With this, the starting time for the image stream included in the following stream 1102 delays by $D_0$ as compared to that in (i).

Further, (iii) of FIG. 4 includes a time required for multiplexing between the preceding stream 1101 and the following stream 1102. With this, the starting time for the image stream included in the following stream 1102 delays by $D_0$ as compared to that in (i).

As described above, the starting time for the image stream included in the following stream 1102 delays by the time required for multiplexing and by an amount of specific information added to the multiplexed stream.

However, the above-described conventional technique made no consideration of such problems, so that the starting time for the image stream is set to be earlier than necessary by mistake.

This makes changes in virtual buffer occupancy incorrect, resulting in an initial value of the buffer occupancy for the following stream 1102 calculated incorrectly.

FIG. 5 is a pattern diagram illustrating incorrect buffer occupancy changes and correct buffer occupancy changes, respectively.

As illustrated in FIG. 5, in conventional techniques, a preceding stream 1101 and a following stream 1102 are assumed to be in a state illustrated by (i). Accordingly, an image stream included in the following stream 1102 starts at a starting time $t_1$. Under the condition, an initial value of virtual buffer occupancy becomes $S_{10}$ as a result of buffer simulation.

However, the starting time practically becomes later than the $t_1$, as illustrated (ii), due to specific information 1203 and 1204 included in the preceding stream 1101 and the following stream 1102, respectively.

More specifically, the starting time becomes a $t_2$ in the present example as illustrated in the diagram. Thus, the correct buffer occupancy changes with lower values than the incorrect buffer occupancy. Consequently, the initial value of the virtual buffer occupancy becomes $S_{11}$.

In other words, the initial value of the virtual buffer occupancy according to the conventional technique becomes $S_{10}$ that is a greater value than the correct value $S_{11}$. Further, an amount of coded data of the first picture in the following stream 1102 is determined based on the $S_{10}$.

In the case where the amount of coded data of the first picture is determined based on the incorrect initial value as described above, an underflow may occur at a time ($t_4$) when the first picture is extracted from the virtual buffer.

In other words, with the above-described conventional technique, a stream which is not in consistent with the specification and may cause underflow in a decoding apparatus may be generated.

It is to be noted that a starting time for storing an image stream included in the following stream 1102 into the virtual buffer may also delays, even when the specific information is not included, due to only a time required for multiplexing between the preceding stream 1101 and the following stream 1102 as illustrated in (iii) of FIG. 4.

SUMMARY OF THE INVENTION

In view of the foregoing problems in the conventional techniques, the present invention aims to provide a moving picture coding apparatus which generates seamlessly-reproducible streams that cause no underflow in a buffer of a decoding apparatus.

In order to solve the foregoing problems in the conventional techniques, the moving picture coding apparatus according to the present invention, which controls coding of a following stream, according to virtual buffer occupancy determined by a generated amount of coded data and an amount of coded data which is transferred to an output destination, when generating the following stream so that a preceding stream and the following stream, in each of which an image stream is multiplexed with other information, are reproduced seamlessly, determines an initial value of the virtual buffer occupancy for the following stream, using an amount of delay resulting from multiplexing, in addition to virtual buffer occupancy at an end of the preceding stream.

The moving picture coding apparatus according to the present invention, as described above, determines the initial value of the virtual buffer occupancy for the following stream taking the amount of delay resulting from multiplexing into consideration. With this, it is possible to perform buffer simulation more practically than conventional techniques. Accordingly, the moving picture coding apparatus according to the present invention can generate plural streams which can be reproduced seamlessly without causing underflow in a buffer of a decoding apparatus.

Further, the moving picture coding apparatus may determine the initial value using a time required for multiplexing performed when generating the following stream, the time being the amount of delay.

Further, the moving picture coding apparatus may further multiplex, with at least one of the preceding stream and the following stream, specific information including control information for ending processing of the preceding stream or starting processing of the following stream, and determine the initial value using an amount of coded data of the specific information, which is the amount of delay.

The moving picture coding apparatus according to the present invention, as described above, can determine the initial value of the virtual buffer occupancy for the following stream using either the time required for multiplexing or the amount of coded data of the specific information, or using both of the time required for multiplexing and the amount of coded data of the specific information.

Further, the moving picture coding apparatus, when determining the initial value, may calculate a first starting time for which the amount of delay is taken into consideration, by adding the amount of delay to a second starting time for which the amount of delay is not taken into consideration, and determine virtual buffer occupancy, which is the initial value, at a time when data of an image stream included in the following stream is extracted from the virtual buffer for a first time by using the calculated first starting time and the virtual buffer occupancy at the end of the preceding stream, each of the first starting time and the second starting time being a starting time for storing an image stream included in the following stream into the virtual buffer.

Further, the moving picture coding apparatus may include: an image coding unit that generates an image stream by coding moving picture data; a multiplexing unit that generates the preceding stream and the following stream by multiplexing the image stream obtained from the image coding unit with other information; and a calculation unit that calculates the amount of delay resulting from multiplexing before the multiplexing unit generates the following stream, and in the moving picture coding apparatus, the image coding unit determines the initial value using the virtual buffer occupancy at an end of the preceding stream and the amount of delay calculated by the calculation unit; and generates an image stream to be included in the following stream by coding moving picture data according to the determined initial value.

In other words, it is possible to realize the image coding apparatus of the present invention by plural processing units.

Further, the calculation unit may calculate a time required for multiplexing, which is the amount of delay, and the image coding unit may determine the initial value using the time required for multiplexing.

Further, the multiplexing unit may multiplex, with at least one of the preceding stream and the following stream, specific information including control information for ending processing of the preceding stream or starting processing of the following stream, the calculation unit may calculate an amount of coded data of the specific information, which is the amount of delay, and the image coding unit may determine the initial value using the amount of coded data of the specific information.

Further, when determining the initial value, the calculation unit may: calculate a first starting time for which the amount of delay is taken into consideration, by adding the amount of delay to a second starting time for which the amount of delay is not taken into consideration; and notify the image coding unit of the calculated first starting time, each of the first starting time and the second starting time being a starting time for storing an image stream included in the following stream into the virtual buffer, and the image coding unit may determine virtual buffer occupancy, which is the initial value, at a time when data of an image stream included in the following stream is extracted from the virtual buffer for a first time, by using the notified first starting time and the virtual buffer occupancy at an end of the preceding stream.

Further, the moving picture coding apparatus according to the present invention can also be realized as an integrated circuit.

Further, the present invention can also be realized as: a method including operations of the characteristic components included in the moving picture coding apparatus of the present invention, as its steps; a program product which, when loaded into a computer, allows a computer to execute these steps; and a recording medium in which such programs are recorded. Further, it is also possible to distribute such a program via a transmission medium such as the Internet and a recording medium such as a DVD.

As has been described above, with the moving picture coding apparatus according to the present invention, it is possible to determine the initial value of the virtual buffer occupancy taking an amount of delay resulting from multiplexing into consideration.

More specifically, it is possible to determine the initial value using a time required for multiplexing performed when generating the following stream and an amount of coded data of specific information which is added to the preceding stream and the following stream.

In other words, the moving picture coding apparatus according to the present invention can perform buffer simulation more practically by taking into consideration the amount of delay which has not been considered in the conventional techniques.

This produces an advantage especially in that the preceding stream and the following stream can be reproduced seamlessly without causing underflow in a buffer of a decoding apparatus.

As has been described above, the present invention makes possible the moving picture coding apparatus that can generate a stream which can be reproduced seamlessly without causing underflow in a buffer of a decoding apparatus.

FURTHER INFORMATION ABOUT TECHNICAL BACKGROUND TO THIS APPLICATION

The disclosure of Japanese Patent Application No. 2007-161657 filed on Jun. 19, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

An embodiment according to the present invention will be described below with reference to the drawings.

Figure 1:
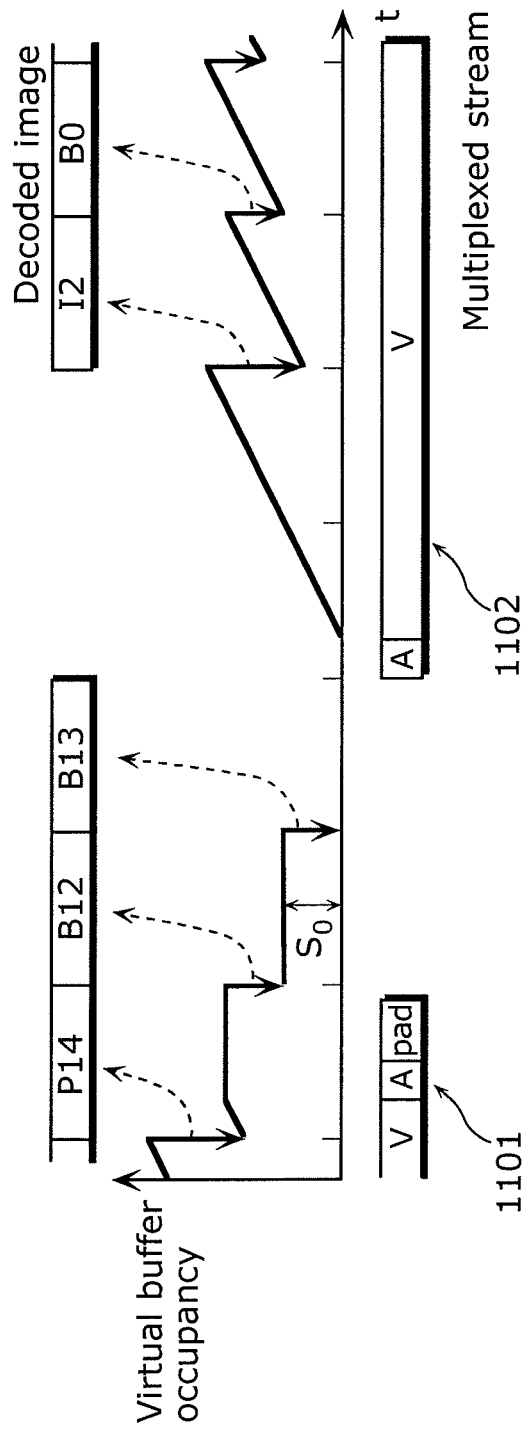
FIG. 1 is a pattern diagram illustrating an example of changes in virtual buffer occupancy for two streams which are not connected seamlessly.
Figure 2:
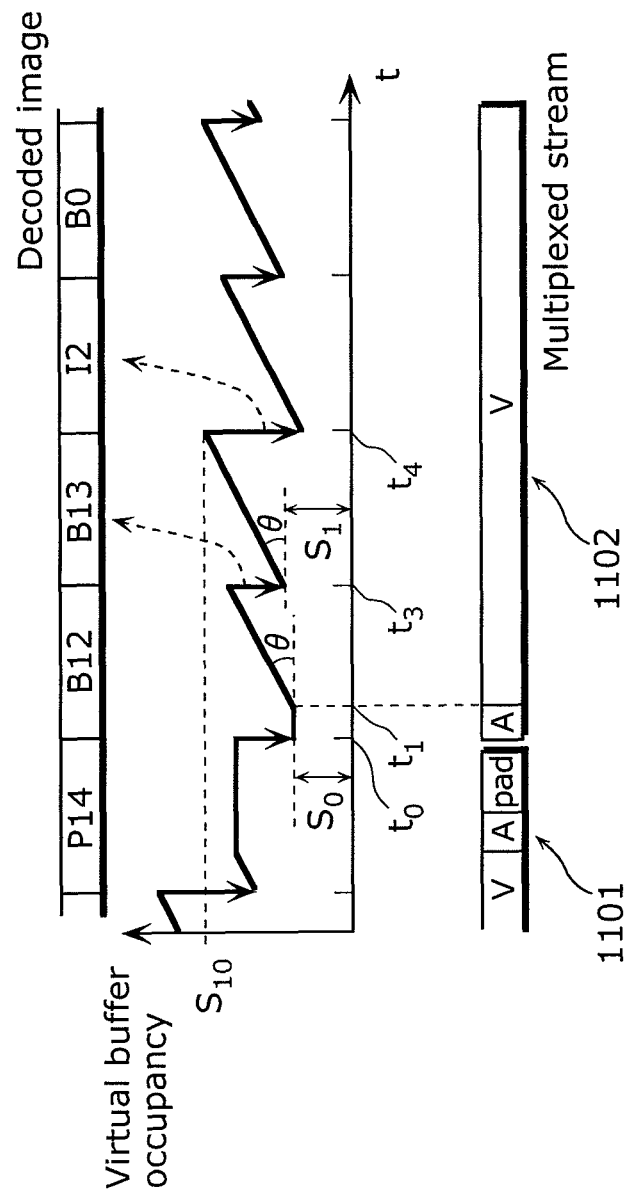
FIG. 2 is a pattern diagram illustrating an example of changes in virtual buffer occupancy for two streams which are connected seamlessly.
Figure 3:
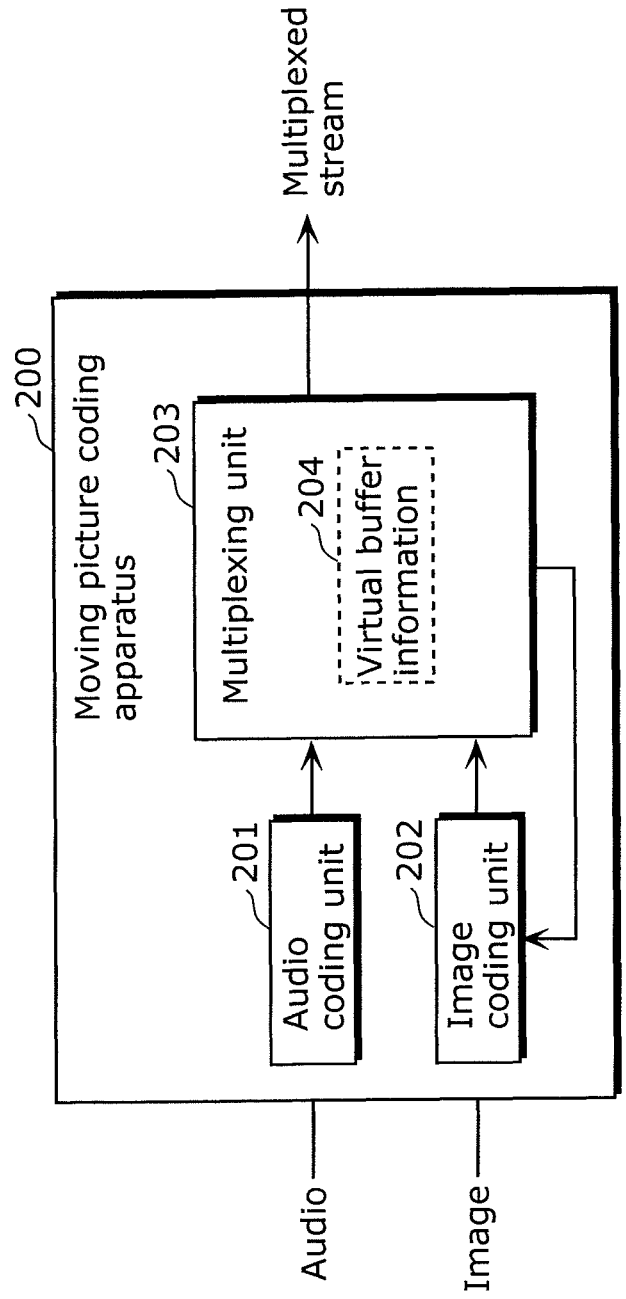
FIG. 3 is a functional block diagram illustrating an example of functional configuration of a conventional moving picture coding apparatus.
Figure 4:
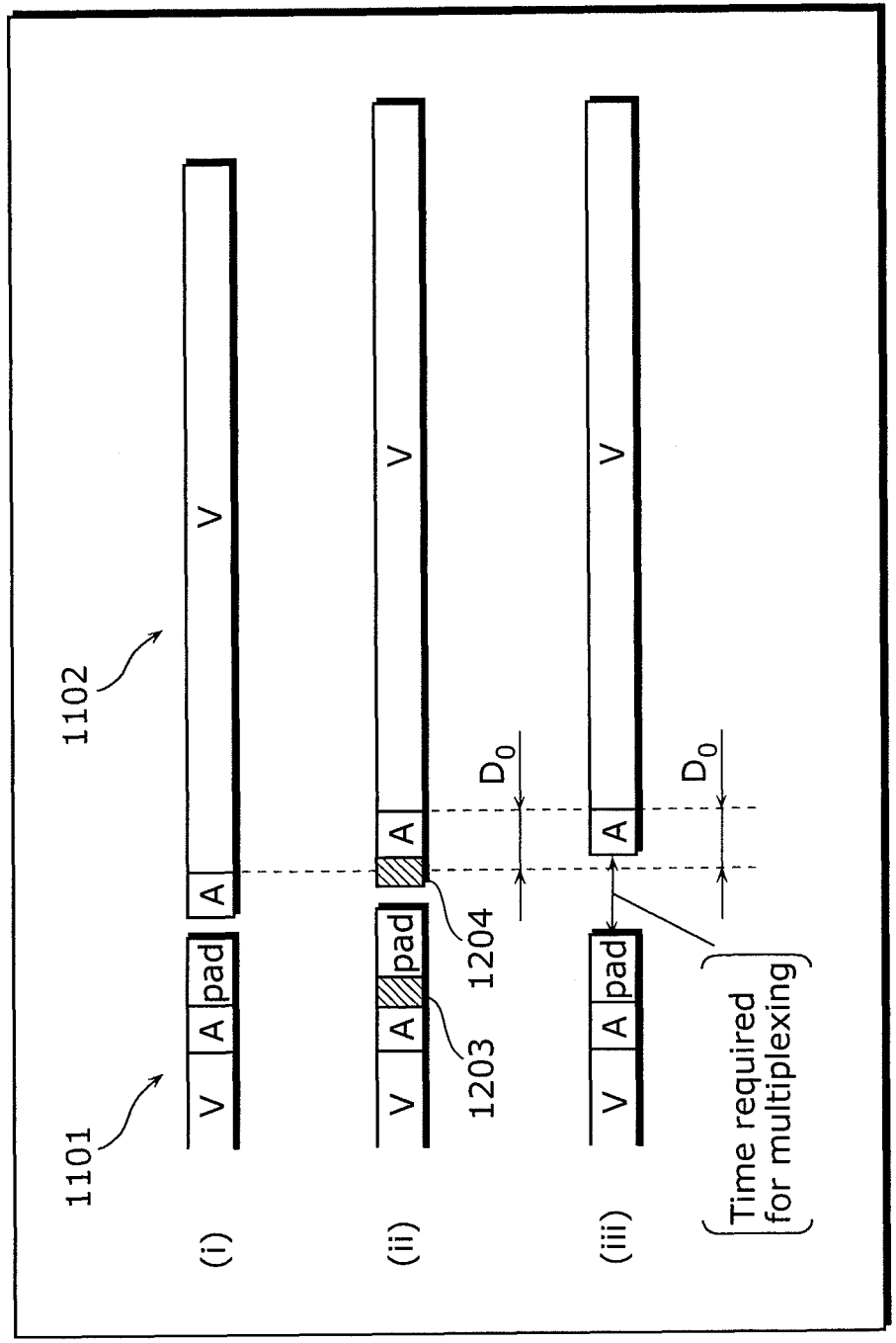
FIG. 4 is a pattern diagram illustrating differences in a starting time for an image stream included in a following stream.
Figure 5:
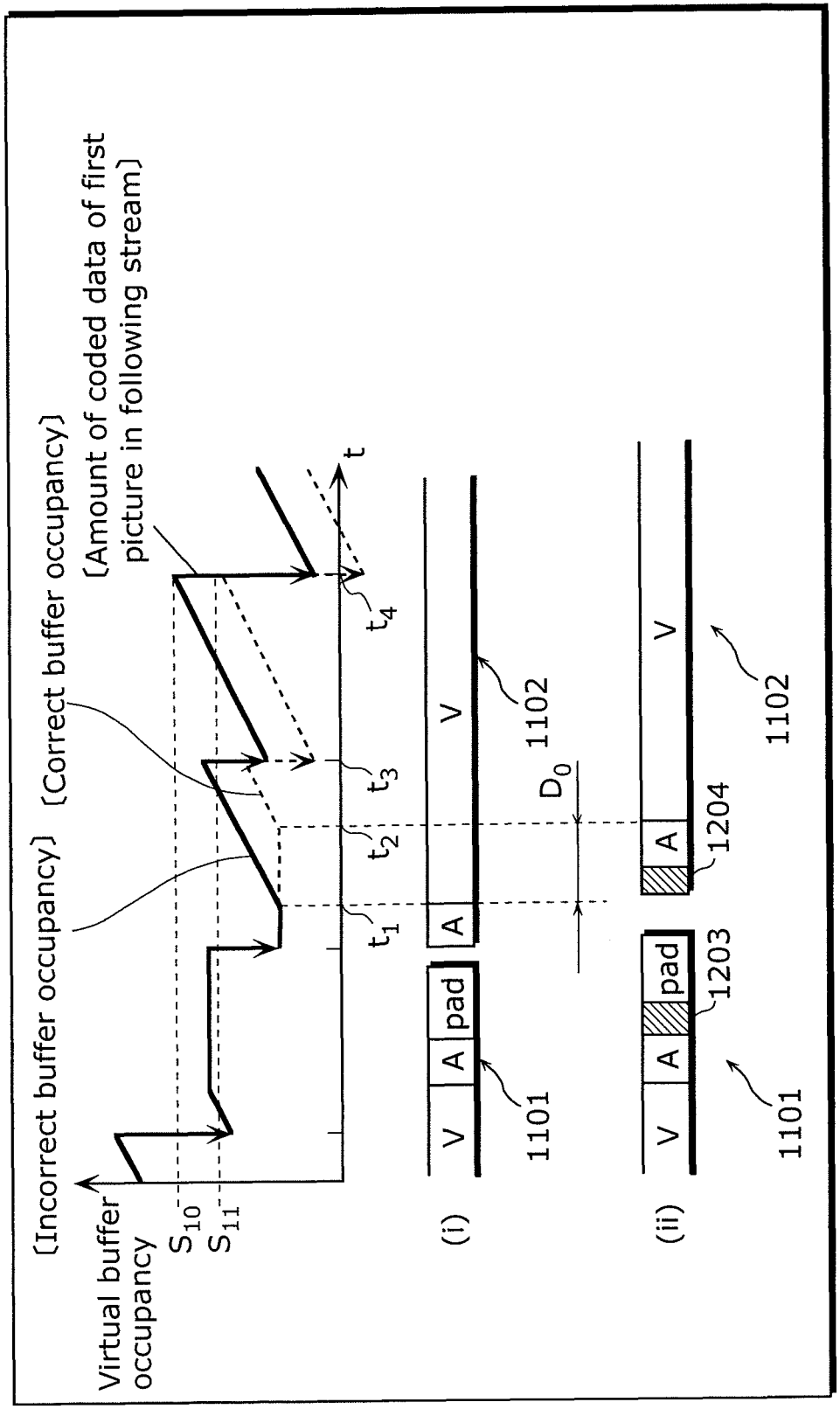
FIG. 5 is a pattern diagram illustrating incorrect buffer occupancy changes and correct buffer occupancy changes, respectively.
Figure 6:
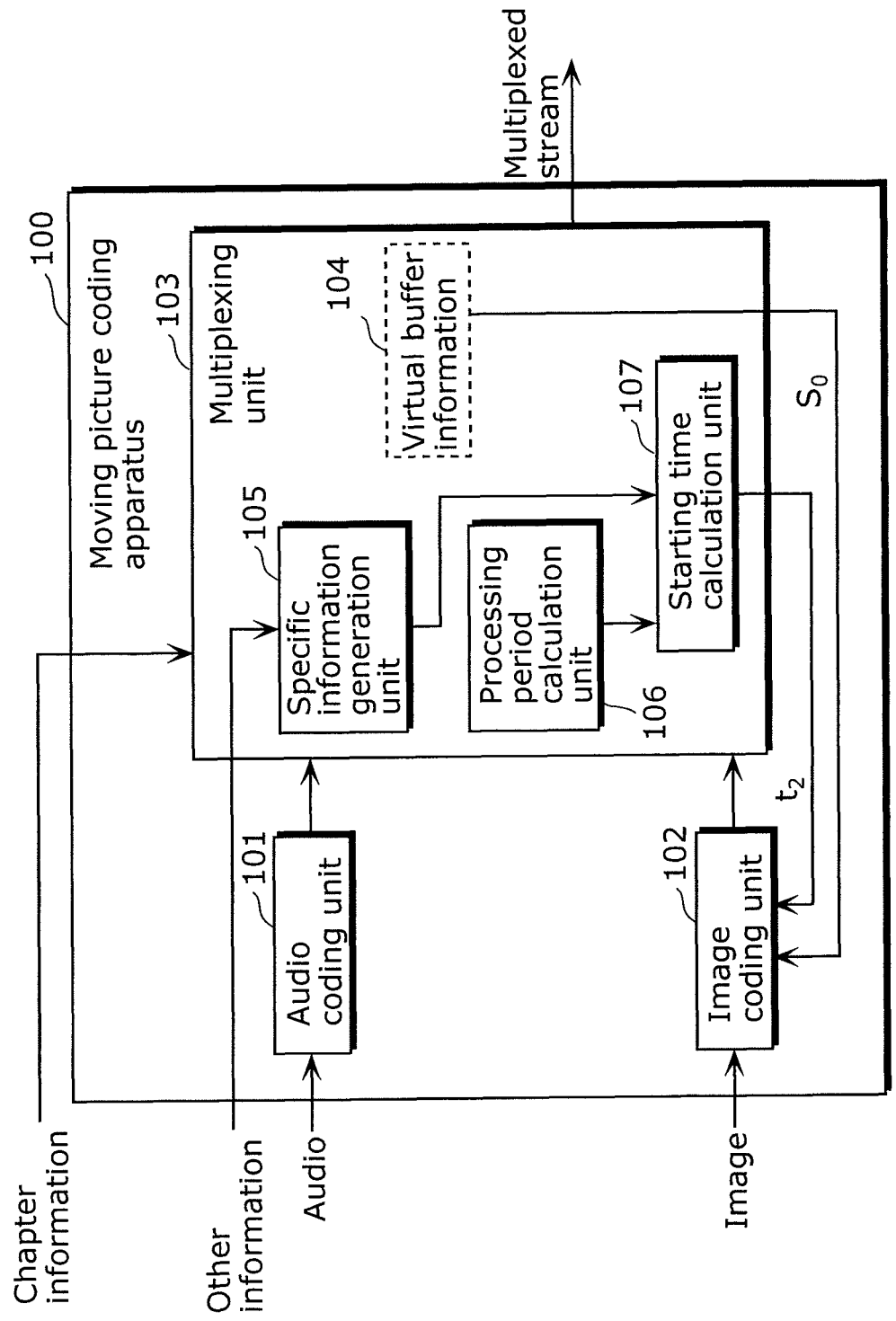
FIG. 6 is a functional block diagram illustrating a configuration of main functional blocks of a moving picture coding apparatus according to an embodiment of the present invention.

FIG. 6 is a functional block diagram illustrating a configuration of main functional blocks of a moving picture coding apparatus according to an embodiment of the present invention.

The moving picture coding apparatus 100 according to the embodiment as illustrated in FIG. 6 controls coding of a following stream, according to virtual buffer occupancy determined by a generated amount of coded data and an amount of coded data which is transferred to an output destination, when generating the following stream so that a preceding stream and the following stream, in each of which an image stream is multiplexed with other information, are reproduced seamlessly.

As illustrated in FIG. 6, the moving picture coding apparatus 100 according to the embodiment includes: an audio coding unit 101; an image coding unit 102; and a multiplexing unit 103.

The multiplexing unit 103 includes: a specific information generation unit 105; a processing period calculation unit 106; and a starting time calculation unit 107. Further, the multiplexing unit 103 holds, as virtual buffer information 104, information indicating a storage amount of a virtual buffer, which has been outputted from the image coding unit 102.

The audio coding unit 101 is a processing unit which generates an audio stream by coding an inputted audio data. The image coding unit 102 is a processing unit which generates an image stream by coding a moving picture data The image coding unit 102 is provided with a function for controlling coding processing performed therein, by performing buffer simulation using a virtual buffer according to a generated amount of coded data, to prevent the virtual buffer from underflowing.

Specifically, the image coding unit 102 determines an initial value of the virtual buffer occupancy for the following stream, using virtual buffer occupancy at the end of the preceding stream and an amount of delay resulting from multiplexing. Further, the image coding unit 102 codes moving picture data according to the initial value which has been determined.

The multiplexing unit 103 is a processing unit that generate a preceding stream and a following stream by multiplexing image stream obtained from the image coding unit 102 with other information.

Specifically, the multiplexing unit 103 generates a multiplexed stream which is time-series data by multiplexing image stream with information such as an audio stream and specific information.

Further, the multiplexing unit 103 has a function for providing the image coding unit 102 with information necessary for executing appropriate buffer simulation.

Specifically, the specific information generation unit 105 generates, according to information inputted from the outside, specific information necessary for ending processing for a stream corresponding to a preceding chapter and specific information necessary for starting processing for a stream corresponding to a following chapter.

Further, the processing period calculation unit 106 calculates a period of time required for multiplexing an image stream, an audio stream, specific information, and the like.

It is to be noted that the processing period calculation unit 106 holds a period of time required for multiplexing each of information, which has been obtained from, for example, a theoretical value or an actual value, or holds an expression for calculating the period of time. Further, the processing period calculation unit 106 calculates an entire period of time required for multiplexing by performing addition and the like, in necessary combination, on a holding time or a time obtained from an expression.

The starting time calculation unit 107 calculates a time when an image stream included in the following stream 1102 starts to be stored (hereinafter simply referred to as "starting time") by using at least one of the amount of coded data of specific information obtained from the specific information generation unit 105 and the time required for multiplexing obtained from the processing period calculation unit 106.

Figure 7:
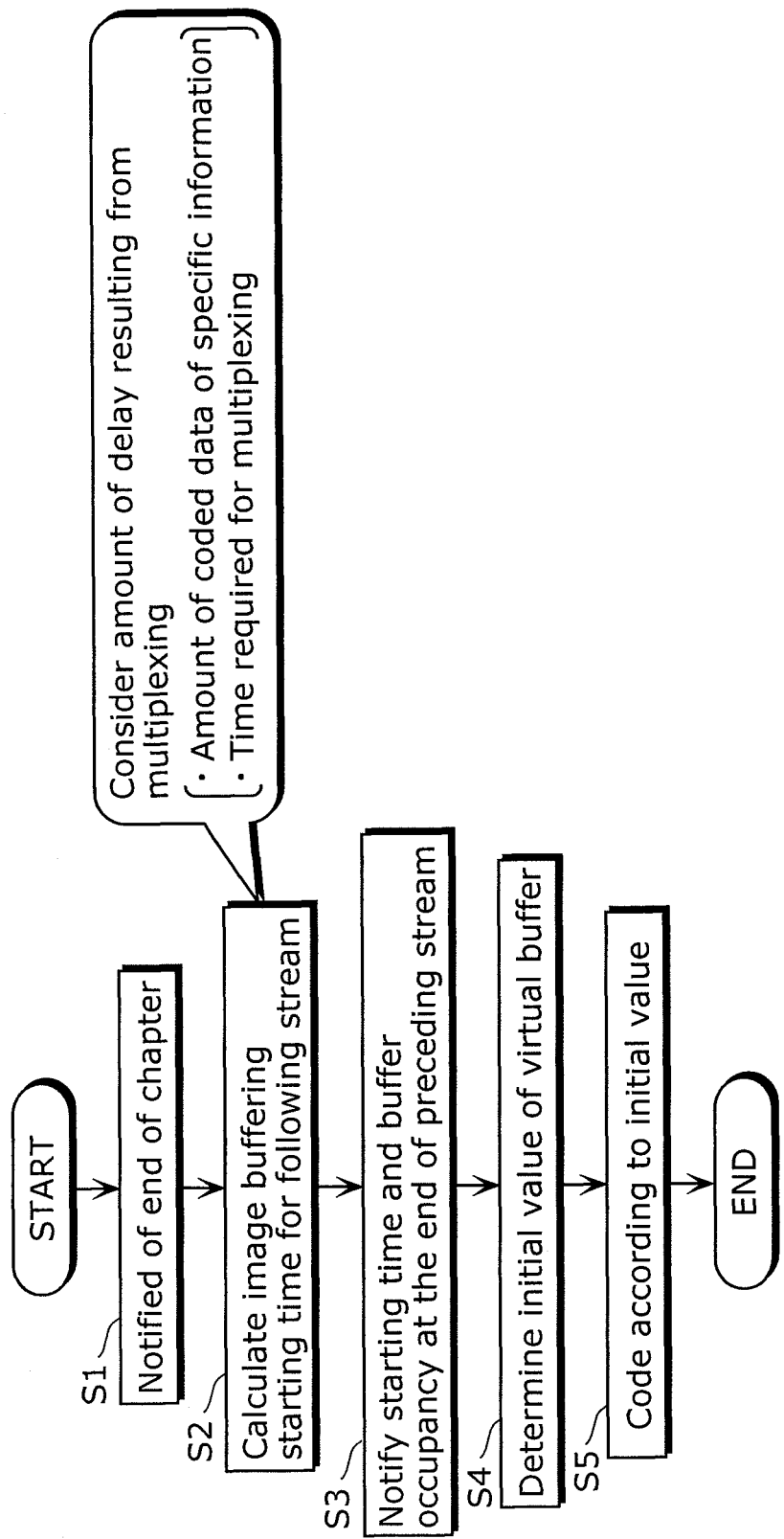
FIG. 7 is a flow chart illustrating operational processing of a moving picture coding apparatus according to an embodiment of the present invention.

FIG. 7 is a flow chart illustrating operational flow of the moving picture coding apparatus 100 according to an embodiment of the present invention.

Figure 8:
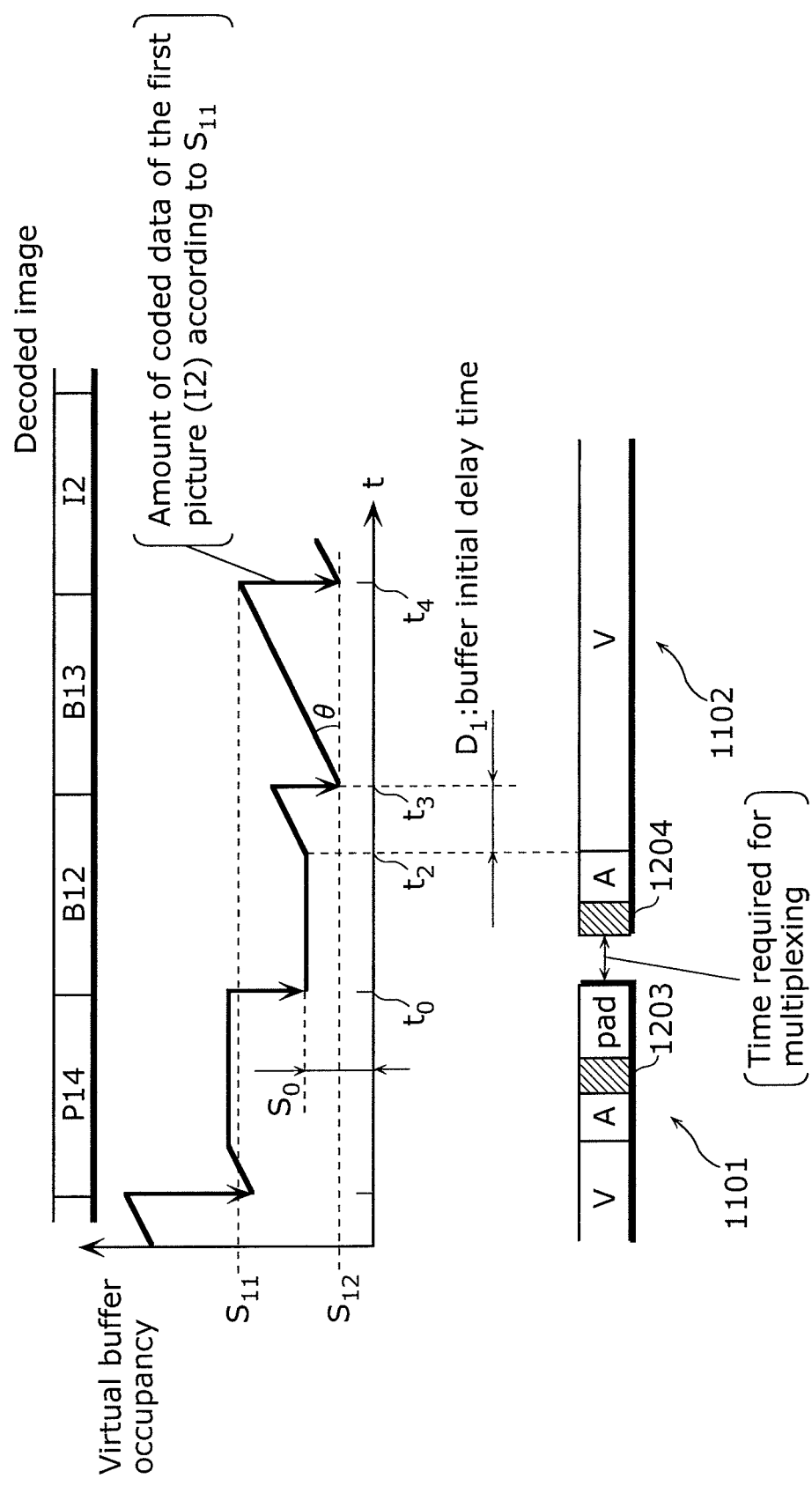
FIG. 8 is a pattern diagram illustrating an example of changes in buffer occupancy for the virtual buffer of the moving picture coding apparatus illustrated in FIG. 7.

FIG. 8 is a pattern diagram illustrating an example of changes in buffer occupancy for the virtual buffer of the moving picture coding apparatus 100.

The operational flow of the moving picture coding apparatus 100 will be described with reference to FIG. 7 and FIG. 8.

The multiplexing unit 103, when notified of an end of a chapter by chapter information inputted from the outside (S1), calculates a storage starting time $t_2$ for an image stream of a following stream 1102 (S2).

Specifically, the starting time calculation unit 107 calculates a time corresponding to an amount of coded data of each of specific information 1203 and 1204 obtained from the specific information generation unit 105, and adds, to the calculated time, the time required for multiplexing obtained from the processing period calculation unit 106. With this, an amount of delay resulting from multiplexing can be obtained.

Further, adding the amount of delay to the starting time for which the amount of delay is not taken into consideration results in the starting time $t_2$ for which the amount of delay is taken into consideration.

The multiplexing unit 103 notifies the image coding unit 102 of the starting time $t_2$ obtained as described above and of the virtual buffer occupancy $S_0$ at the end of the preceding stream 1101 held as the virtual buffer information 104 (S3).

The image coding unit 102 performs buffer simulation using the $t_2$ and the $S_0$ received from the multiplexing unit 103, and determines an initial value $S_{11}$ of the virtual buffer occupancy for the following stream 1102 (S4).

Further, the image coding unit 102 subtracts, from the initial value $S_{11}$, $S_{12}$ ($0 \leq S_{12} < S_{11}$) that is a predetermined margin amount and determines an amount of coded data of the first picture (I2) so as to be equal to or less than the value after the subtraction.

Further, the image coding unit 102 determines an amount of coded data of each of the following pictures so as to prevent the virtual buffer from overflowing and underflowing.

The image coding unit 102 codes inputted moving picture data so that each of the pictures becomes the determined amount of coded data (S5).

Further, the image coding unit 102 calculates a value $D_1$ using the following expression.

$$D_1 = t_3 - t_2 \qquad \text{(Expression 1)}$$

The $D_1$ is a value corresponding to a buffer initial delay time for an image stream included in the following stream 1102.

The image coding unit 102 sets the $D_1$ to the image stream as vbv_delay in the case of an MPEG2 coding method. Further, the image coding unit 102 sets the $D_1$ to the image stream as initial_cpb_removal_delay in the case of an H.264 decoding method.

Subsequently, the multiplexing unit 103 generates and outputs a following stream 1102 by multiplexing the image stream obtained from the image coding unit 102 with the audio stream obtained from the audio coding unit 101 and specific information generated as necessary.

As has been described above, the moving picture coding apparatus 100, when determining an initial value of the virtual buffer occupancy for the following stream 1102 in a buffer simulation, determines the initial value using, in addition to the virtual buffer occupancy at the end of the preceding stream 1101, the amount of delay resulting from multiplexing.

Further, the moving picture coding apparatus 100 determines, according to the initial value of the virtual buffer which has been determined as described above, an amount of coded data of each picture of an image stream included in the following stream 1102.

The moving picture coding apparatus 100 allows, by controlling coding processing as described above, to-be-outputted streams to be reproduced seamlessly without causing the buffer of the decoding apparatus to overflow.

It is to be noted that, in the present embodiment, the virtual buffer $S_0$ at the end of the preceding stream 1101 is assumed to be notified to the image coding unit 102 from the multiplexing unit 103.

However, the virtual buffer occupancy $S_0$ is a value obtained from a buffer simulation performed by the image coding unit 102. Accordingly, the $S_0$ may be held by the image coding unit 102 and used for calculating the initial value $S_{11}$ of the virtual buffer occupancy for the following stream 1102.

Further, it is assumed that the multiplexing unit 103 calculates the storage starting time $t_2$ for the image stream of the following stream 1102 and notifies the calculation to the image coding unit 102.

However, the multiplexing unit 103 may notify the image coding unit 102 of, in place of the starting time $t_2$, only the amount of coded data of the specific information and the time required for multiplexing, that is, information indicating the amount of delay resulting from the multiplexing.

In this case, the image coding unit 102 can obtain a correct starting time $t_2$ by adding the amount of delay resulting from the multiplexing to the predetermined starting time for which the amount of delay is not taken into consideration.

Accordingly, it is sufficient for the moving picture coding apparatus 100 to include, in consideration of the amount of delay resulting from multiplexing, the function to determine the initial value $S_{11}$ of the virtual buffer occupancy for the following stream 1102, in addition to indispensable functions to be included, such as the function of coding inputted signal and the function of multiplexing each information.

Accordingly, the processing unit to calculate the correct starting time $t_2$ for determining the initial value $S_{11}$ of the virtual buffer occupancy may be determined in consideration of implementation convenience, coding efficiency, and the like.

Further, functional blocks contained in the moving picture coding apparatus 100 may be realized typically as a Large-Scale Integration (LSI).

Figure 9:
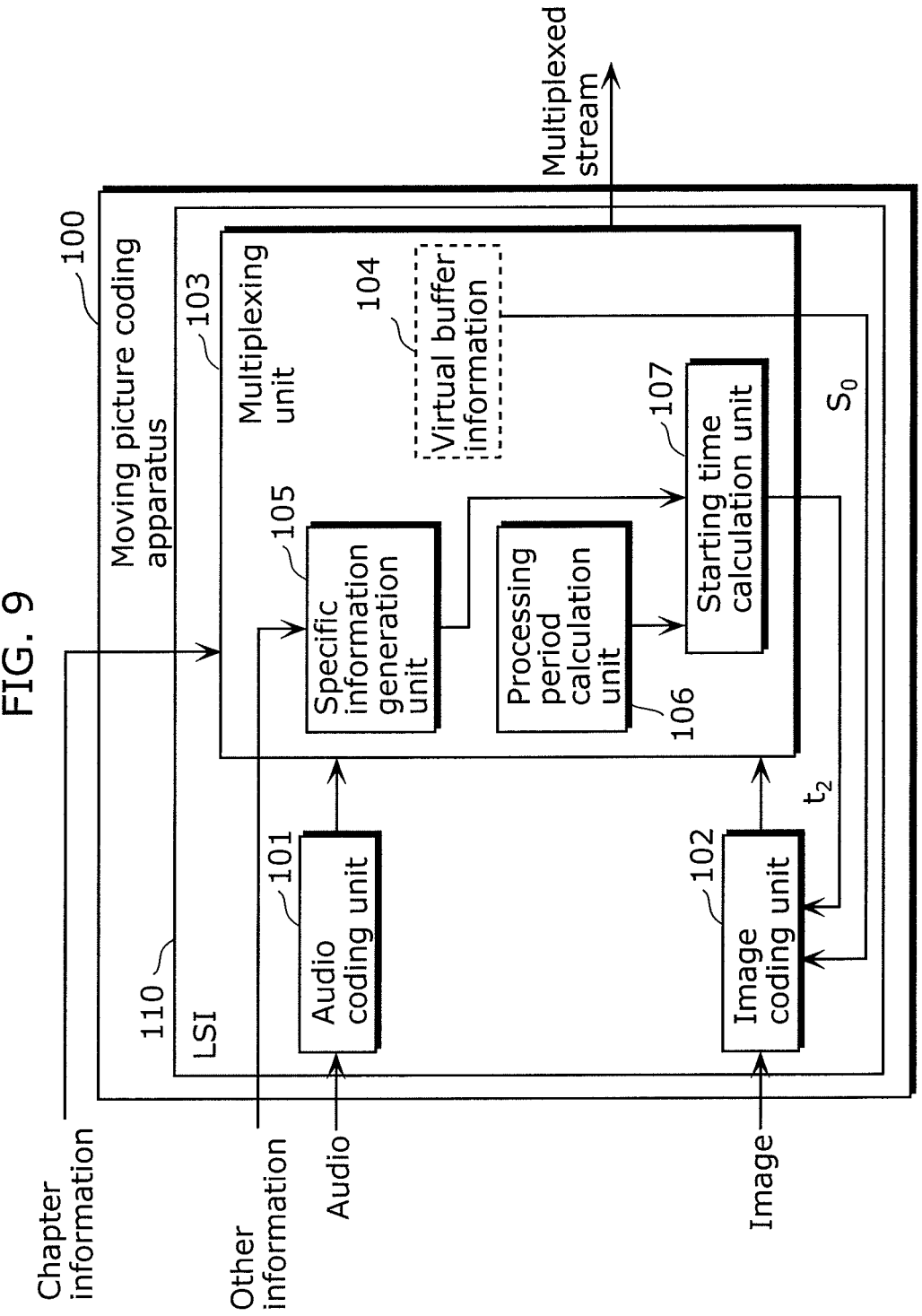
FIG. 9 illustrates an example of a moving picture coding apparatus, according to the embodiment, arranged to be an integrated circuit.

FIG. 9 illustrates an example of a moving picture coding apparatus 100, according to the embodiment, arranged to be an integrated circuit.

An LSI 110 illustrated in FIG. 9 is an example of arrangement as an integrated circuit. More specifically, all of the functional blocks characteristic in the moving picture coding apparatus 100 may be realized as a single integrated circuit, as illustrated in FIG. 9.

It is to be noted that each of the functional blocks included in the moving picture coding apparatus 100 may be realized as a single chip one-by-one, or as a single chip to include some of functional blocks.

It is to be noted that the LSI here can be referred to as an Integrated Circuit (IC), a system LSI, a super LSI, and an ultra LSI, depending on their degrees of integration.

Further, an integrated circuit used for such an embodiment is not limited to an LSI, and it may be embodied as a dedicated circuit or a general-purpose processor. It is also possible to use a field programmable gate array (FPGA) which can be programmed in the field after manufacturing an LSI, or a reconfigurable processor in which connection and setting of circuit cells inside an LSI can be reconfigured.

Furthermore, when a technology for the integrated circuit replacing LSI is developed with the advance of semiconductor technology or relevant technology, functional blocks can be integrated using the technology. Possible filed of technology to be applicable include, for example, bio technology and the like.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The moving picture coding apparatus according to the present invention controls coding processing on an image stream using an amount of delay resulting from multiplexing, such as an amount of coded data of specific information which is multiplexed with the image stream and time required for multiplexing.

This allows the decoding apparatus which decodes a stream outputted from the moving picture coding apparatus according to the present invention and reproduces the decoded stream to reproduce the stream seamlessly without causing an underflow in the buffer.

Accordingly, the present invention is useful for a digital camera and the like which require such a coding control.

What is claimed is:

1. A moving picture coding apparatus for coding inputted audio data and moving picture data including first moving picture data and second moving picture data following the first moving picture data, the moving picture coding apparatus comprising:

an audio coding unit configured to code the audio data to output an audio stream;

an image coding unit including a processor which codes the moving picture data based on a result of a buffer simulation to output an image stream, the buffer simulation indicating a transition of a virtual data occupancy in decoding the coded moving picture data; and a multiplexing unit configured to multiplex the output audio stream, the output image stream, and other information, to generate a multiplexed stream, wherein, when coding the second moving picture data to output a second moving stream, the image coding unit executes the buffer simulation in consideration of an amount of processing time required for the multiplexing unit to complete a multiplexing process, wherein, when the image coding unit codes the second moving picture data to output the second moving stream, the multiplexing unit (a) sets a starting time at which the virtual data occupancy increases in an actual buffer simulation, by adding (i) an amount of time required for multiplexing the second moving picture stream, an audio stream corresponding to the second moving picture stream, and the other information, to (ii) a starting time at which the virtual data occupancy first increases in the buffer simulation of the second moving picture data when a time required for the multiplexing process to multiplex the second moving picture stream, the audio stream corresponding to the second moving picture stream, and the other information is not taken into consideration, (b) sets the virtual data occupancy at the starting time as a data occupancy at a time when coding of the first moving picture data is completed, and (c) outputs the set data occupancy and the set starting time to the image coding unit, and wherein, when coding the second moving picture data, the image coding unit executes the buffer simulation using an initial virtual data occupancy when the second moving picture data is first extracted from the virtual buffer in the buffer simulation, the initial virtual data occupancy being determined from the set virtual data occupancy and the set starting time outputted from the multiplexing unit.

2. A moving picture coding method of using a moving picture coding apparatus to code inputted audio data and moving picture data including first moving picture data and second moving picture data following the first moving picture data, the moving picture coding method comprising:

coding, via an audio coding unit of the moving picture coding apparatus, the audio data to output an audio stream;

coding, via an image coding unit of the moving picture coding apparatus, the moving picture data based on a result of a buffer simulation to output an image stream, the buffer simulation indicating a transition of a virtual data occupancy in decoding the coded moving picture data; and multiplexing, via a multiplexing unit of the moving picture coding apparatus, the output audio stream, the output image stream, and other information, to generate a multiplexed stream, wherein, when said coding of the moving picture data codes the second moving picture data to output a second moving stream, said coding of the moving picture data executes the buffer simulation in consideration of an amount of processing time required for said multiplexing to complete a multiplexing process, wherein, when said coding of the moving picture data codes the second moving picture data to output the second moving stream, said multiplexing (a) sets a starting time at which the virtual data occupancy increases in an actual buffer simulation, by adding (i) an amount of time required for multiplexing the second moving picture stream, an audio stream corresponding to the second moving picture stream, and the other information, to (ii) a starting time at which the virtual data occupancy first increases in the buffer simulation of the second moving picture data when a time required for the multiplexing process of said multiplexing to multiplex the second moving picture stream, the audio stream corresponding to the second moving picture stream, and the other information is not taken into consideration, (b) sets the virtual data occupancy at the starting time as a data occupancy at a time when said coding of the moving picture data completes coding of the first moving picture data, and (c) outputs the set data occupancy and the set starting time to the image coding unit, and wherein, when said coding of the moving picture data codes the second moving picture data, said coding of the moving picture data executes the buffer simulation using an initial virtual data occupancy when the second moving picture data is first extracted from the virtual buffer in the buffer simulation, the initial virtual data occupancy being determined from the set virtual data occupancy and the set starting time outputted from said multiplexing.

* * * * *